US012540249B2

United States Patent
Nakashima et al.

(10) Patent No.: US 12,540,249 B2
(45) Date of Patent: Feb. 3, 2026

(54) CATIONIC ELECTRODEPOSITION COATING COMPOSITION

(71) Applicant: NIPPON PAINT AUTOMOTIVE COATINGS CO., LTD., Osaka (JP)

(72) Inventors: Sari Nakashima, Hirakata (JP); Yuto Iwahashi, Hirakata (JP); Toshio Inbe, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 214 days.

(21) Appl. No.: 18/033,419

(22) PCT Filed: Oct. 29, 2021

(86) PCT No.: PCT/JP2021/040118
§ 371 (c)(1),
(2) Date: Apr. 24, 2023

(87) PCT Pub. No.: WO2022/092288
PCT Pub. Date: May 5, 2022

(65) Prior Publication Data
US 2023/0365820 A1 Nov. 16, 2023

(30) Foreign Application Priority Data
Nov. 2, 2020 (JP) ................. 2020-183783

(51) Int. Cl.
*C09D 5/44* (2006.01)
*C08G 59/24* (2006.01)
*C08G 59/28* (2006.01)
*C08G 59/40* (2006.01)

(52) U.S. Cl.
CPC ......... *C09D 5/4496* (2013.01); *C08G 59/245* (2013.01); *C08G 59/28* (2013.01); *C08G 59/4028* (2013.01); *C09D 5/4438* (2013.01)

(58) Field of Classification Search
None
See application file for complete search history.

(56) References Cited

U.S. PATENT DOCUMENTS

| 5,331,026 A | 7/1994 | Benefiel et al. |
| 2006/0122361 A1* | 6/2006 | Olson ............. C08L 79/085 |
| | | 528/367 |
| 2009/0143526 A1 | 6/2009 | Hirose |

FOREIGN PATENT DOCUMENTS

| EP | 0 333 327 | 9/1989 |
| EP | 2 382 275 | 8/2014 |
| JP | 6-9920 | 1/1994 |
| JP | 2000-501448 | 2/2000 |
| JP | 2000-169548 | 6/2000 |
| JP | 2009-149867 | 7/2009 |
| JP | 2010-280787 | 12/2010 |
| JP | 2020-100732 | 7/2020 |
| WO | 98/07770 | 2/1998 |
| WO | WO-0012636 A1 * | 3/2000 ............ C08F 293/00 |

OTHER PUBLICATIONS

International Preliminary Report on Patentability issued May 2, 2023 in International (PCT) Application No. PCT/JP2021/040118.
International Search Report (ISR) issued Dec. 28, 2021 in International (PCT) Application No. PCT/JP2021/040118.
Extended European Search Report issued Oct. 7, 2024 in corresponding European Application No. 21886405.6.

* cited by examiner

*Primary Examiner* — Megan McCulley
(74) *Attorney, Agent, or Firm* — Wenderoth, Lind & Ponack, L.L.P.

(57) ABSTRACT

The present invention provides a cationic electrodeposition coating composition with a rust prevention property enhanced by improving the adhesion and the blocking property of a coating film obtained from a cationic electrodeposition coating composition as compared with conventional ones. The present invention provides a cationic electrodeposition coating composition including an aminated epoxy resin and a blocked polyisocyanate curing agent, wherein the aminated epoxy resin is an aminated epoxy resin obtained by reacting an amine compound with an epoxy resin, the aminated epoxy resin has a molecular weight distribution of 2.7 or less, and a rate of elongation of an electrodeposition coating film formed by applying the cationic electrodeposition coating composition to a steel sheet such that a cured film thickness is 20 μm, followed by baking at 160° C. for 15 minutes, is 0.1 to 4.5%.

2 Claims, No Drawings

CATIONIC ELECTRODEPOSITION COATING COMPOSITION

TECHNICAL FIELD

The present invention relates to a cationic electrodeposition coating composition, particularly a cationic electrodeposition coating composition having high corrosion resistance.

BACKGROUND ART

Cationic electrodeposition coating materials are frequently used as an undercoating material for imparting corrosion resistance to industrial products such as automobiles, and contain an aminated epoxy resin and a blocked polyisocyanate curing agent. Cationic electrodeposition coating materials are required to have high adhesion, high hydrophobicity (blocking property) and the like in addition to high rust prevention property.

The adhesion and the hydrophobicity (blocking property) of a cationic electrodeposition coating material are important performances contributing to the rust prevention property, and are always required to be improved. For example, JP-A-2000-501448 (Patent Literature 1) discloses a cationic electrodeposition coating composition using a reaction product of a diamine compound having a primary amino group and a tertiary amino group with an epoxy resin, but further improvement in adhesion and blocking property is required.

CITATIONS LIST

Patent Literature

Patent Literature 1: JP-A-2000-501448

SUMMARY OF INVENTION

Technical Problems

The present invention provides a cationic electrodeposition coating composition with a rust prevention property enhanced by improving the adhesion and the blocking property of a coating film obtained from a cationic electrodeposition coating composition as compared with conventional ones.

Solutions to Problems

The present invention provides the following embodiments.

[1] A cationic electrodeposition coating composition including an aminated epoxy resin and a blocked polyisocyanate curing agent, wherein
the aminated epoxy resin is an aminated epoxy resin obtained by reacting an amine compound with an epoxy resin,
the aminated epoxy resin has a molecular weight distribution of 2.7 or less, and
a rate of elongation of an electrodeposition coating film formed by applying the cationic electrodeposition coating composition to a steel sheet such that a cured film thickness is 20 µm, followed by baking at 160° C. for 15 minutes, is 0.1 to 4.5%.

[2] The cationic electrodeposition coating composition according to [1], wherein
the amine compound is a combination of two amines, a first amine and a second amine,
the first amine is represented by a formula:

$$NH_2-(CH_2)_n-NR^1R^2 \qquad (1)$$

in the formula (1), $R^1$ and $R^2$ are the same or different and each represent an alkyl group having 1 to 6 carbon atoms and optionally having a hydroxy group at a terminal thereof, and n represents an integer of 2 to 4, and the second amine is represented by a formula:

$$R^3R^4NH \qquad (2)$$

in the formula (2), $R^3$ and $R^4$ each represent an alkyl group having 1 to 4 carbon atoms and having a hydroxy group at a terminal thereof.

[3] The cationic electrodeposition coating composition according to [1] or [2], wherein
a tertiary amination rate of the amine compound in obtaining the aminated epoxy resin is 85% or more.

[4] A cationic electrodeposition coating film formed using the cationic electrodeposition coating composition according to any one of [1] to [3].

Advantageous Effects of Invention

The cationic electrodeposition coating composition of the present invention includes an aminated epoxy resin and a blocked polyisocyanate curing agent, wherein the aminated epoxy resin has a molecular weight distribution of 2.7 or less, and the rate of elongation of an electrodeposition coating film formed by applying the cationic electrodeposition coating composition to a steel sheet such that a cured film thickness is 20 µm, followed by baking at 160° C. for 15 minutes, is 0.1 to 4.5%. That the molecular weight distribution of the aminated epoxy resin is as narrow as 2.7 or less means that side reactions of the reaction between the epoxy resin and the amine compound are reduced, so that an aminated epoxy resin having a desired structure has been obtained, and the aminated epoxy resin has become possible to exhibit the performance (specifically, for example, corrosion resistance). When the rate of elongation of the electrodeposition coating film is 0.1 to 4.5%, the rate of elongation is within a range required for exhibiting the performance of the electrodeposition coating film, so that corrosion resistance, adhesion, and blocking property can be exhibited.

DESCRIPTION OF EMBODIMENTS

The cationic electrodeposition coating composition of the present invention includes an aminated epoxy resin and a blocked polyisocyanate curing agent, wherein the aminated epoxy resin is an aminated epoxy resin obtained by reacting an amine compound with an epoxy resin, the aminated epoxy resin has a molecular weight distribution of 2.7 or less, and a rate of elongation of an electrodeposition coating film formed by applying the cationic electrodeposition coating composition to a steel sheet such that a cured film thickness is 20 µm, followed by baking at 160° C. for 15 minutes, is 0.1 to 4.5%. In the present description, when a numerical range is expressed by "a to b" (a and b both represent numerical values), this shall represent a or more and b or less.

<Aminated Epoxy Resin>

The aminated epoxy resin is a coating film forming resin for constituting an electrodeposition coating film. The aminated epoxy resin is obtained by modifying, or aminating, an oxirane ring (also referred to as "epoxy group") of an epoxy resin with an amine compound.

The starting epoxy resin is a polyphenol polyglycidyl ether type epoxy resin, which is a reaction product of a polycyclic phenol compound, such as bisphenol A, bisphenol F, bisphenol S, phenol novolac, and cresol novolac, with epichlorohydrin. In this description, the term "polyphenol polyglycidyl ether type epoxy resin" includes a state where a polyphenol polyglycidyl ether type epoxy resin and the polycyclic phenol compound have undergone a reaction (chain extension reaction). In the amine modification step, it is preferable to use an epoxy resin in which the polyphenol polyglycidyl ether type epoxy resin and the polycyclic phenol compound have undergone a reaction (chain extension reaction). The reaction condition under which the polyphenol polyglycidyl ether type epoxy resin and the polycyclic phenol compound are made to undergo a chain extension reaction can be appropriately chosen according to the stirring apparatus to be used, a reaction scale, etc. Examples the reaction condition include a condition where the reaction is carried out at 85 to 180° C. for 0.1 to 8 hours, preferably at 100 to 150° C. for 2 to 8 hours. As the stirring apparatus to be used, a stirrer that is commonly used in the field of coating material can be used.

Examples of other starting resins include the oxazoline ring-containing epoxy resins disclosed in JP-A-5-306327. Such epoxy resins can be prepared via a reaction of a diisocyanate compound or a bisurethane compound obtained by blocking the isocyanate groups of a diisocyanate compound with a lower alcohol such as methanol and ethanol, with epichlorohydrin.

The epoxy resin may partially be made to undergo, before the amination, a chain extension reaction partly with a bifunctional polyester polyol, a polyether polyol (for example, a polyol having a polyethylene oxide group and a polyol having a polypropylene oxide group), a dibasic carboxylic acid, or the like. For example, when performing a chain extension reaction using a polyol having a polypropylene oxide group, a polypropylene oxide group-containing epoxy resin is formed. Examples of this embodiment include a state where the polyphenol polyglycidyl ether type epoxy resin, the polycyclic phenol compound, and the polypropylene oxide group-containing epoxy resin have undergone a reaction (chain extension reaction). When the epoxy resin to be reacted with the amine compound in the amine modification step contains a polypropylene oxide group-containing epoxy resin, the content of the polypropylene oxide group-containing epoxy resin is preferably 1 to 40 parts by mass, and more preferably 15 to 25 parts by mass, relative to 100 parts by mass of the epoxy resin.

Usually, an aminated epoxy resin is obtained by reacting oxirane rings of the above epoxy resin with an amine compound. As the amine compound, an amine compound generally used in the production of an aminated epoxy resin is used. Examples of the amine compound to be generally used include primary amines such as butylamine, octylamine, and monoethanolamine; secondary amines such as diethylamine, dibutylamine, methylbutylamine, diethanolamine, and N-methylethanolamine; and composite amines such as diethylenetriamine. The primary amine forms a ketimine group using a ketone compound, and can control the reaction by so-called blocking. Examples of the amine compound having a ketimine group or a diketimine group that can be used include a ketimine of aminoethylethanolamine and a diketimine of diethylenetriamine. Examples of the ketone compound that generates a ketimine group include methyl isopropyl ketone (MIPK), diisobutyl ketone (DIBK), methyl isobutyl ketone (MIBK), diethyl ketone (DEK), ethyl butyl ketone (EBK), ethyl propyl ketone (EPK), dipropyl ketone (DPK), and methyl ethyl ketone (MEK), and methyl isobutyl ketone (MIBK) is preferably used. A tertiary amine may be used as the amine compound, and specifically, examples of thereof include triethylamine, N,N-dimethylbenzylamine, and N,N-dimethylethanolamine. These amines may be used singly, or two or more of them may be used in combination.

In the present invention, it is necessary to control the molecular weight distribution of the aminated epoxy resin to 2.7 or less. When as the amine compound, specific one is selected in order to control the molecular weight distribution, it is easy to control the molecular weight distribution. Specifically, the amine compound is a combination of two amines, a first amine and a second amine, and the first amine is represented by a formula:

$$NH_2-(CH_2)_n-NR^1R^2 \qquad (1)$$

in the formula (1), $R^1$ and $R^2$ are the same or different and each represent an alkyl group having 1 to 6 carbon atoms and optionally having a hydroxy group at a terminal thereof, and n represents an integer of 2 to 4, and the second amine is represented by a formula:

$$R^3R^4NH \qquad (2)$$

in the formula (2), $R^3$ and $R^4$ each represent an alkyl group having 1 to 4 carbon atoms and having a hydroxy group at a terminal thereof. It is considered that when these amine compounds are used, first, primary amino groups of the first amine react with the epoxy resin to be consumed and, as a result, only secondary amino groups remain, and then the secondary amino groups react with epoxy groups of the epoxy resin, and therefore the reaction proceeds uniformly regardless of reactivity and the molecular weight distribution can be controlled. It is also conceivable that the tertiary amino group generated through the reaction of the tertiary amino group or the secondary amino group present in the first amine also reacts with the epoxy group to become a quaternary ammonium group, but this reaction is considered to occur in a small frequency.

The first amine has a compound having the above formula (1), wherein $R^1$ and $R^2$ are specifically methyl, ethyl, propyl, or butyl, and the first amine may have a hydroxy group at a terminal. n is 2 to 4, and preferably 3. Specifically, examples of the first amine include aminopropyldiethanolamine, dimethylaminopropanediamine, diethylaminopropanediamine, and dibutylaminopropanediamine. The second amine is a secondary amine having the above formula (2), wherein $R^3$ and $R^4$ are bonded to the nitrogen atom, and $R^3$ and $R^4$ both have an alkyl group having 1 to 4 carbon atoms and having a hydroxy group. Specifically, examples of the second amine include dimethanolamine and diethanolamine.

In the amine modification step, the amount of the amine compound to be reacted with the epoxy resin is preferably in an amount of 0.9 to 1.2 equivalents per equivalent of the epoxy groups of the epoxy resin. When the first amine and the second amine are used as the amine compound as described above, the amount of the first amine is 30 to 80% by weight of the total amount of the amine compound, and more preferably 40 to 70% by weight. When the amount of the first amine is more than 80% by weight of the total amount of the amine compound, the viscosity of the resin becomes high and it becomes difficult to stir the resin, whereas when the amount is less than 30% by weight, there is a disadvantage that the stability of the emulsion lowers.

The reaction condition under which the amine compound is reacted with the epoxy resin to effect amine modification can be chosen appropriately according to the reaction scale, etc. Examples the reaction condition include a condition where the reaction is carried out at 80 to 150° C. for 0.1 to 5 hours, and preferably at 120 to 150° C. for 0.5 to 3 hours.

The number-average molecular weight of the aminated epoxy resin is preferably in a range of 1,000 to 7,000. Due to the condition that the number-average molecular weight is 1,000 or more, a resulting cured electrodeposition coating film has good physical properties such as solvent resistance and corrosion resistance. On the other hand, due to the condition that the number-average molecular weight is 7,000 or less, it becomes easy to adjust the viscosity of the aminated epoxy resin and possible to perform smooth synthesis, and it becomes easy to handle emulsification and dispersion of the resulting aminated epoxy resin. The number-average molecular weight of the aminated epoxy resin is more preferably in a range of 1,500 to 4,000.

In the present invention, the molecular weight distribution of the aminated epoxy resin needs to be adjusted to 2.7 or less, and preferably 2.5 or less. The molecular weight distribution means the ratio of weight-average molecular weight (Mw) to number-average molecular weight (Mn), Mw/Mn. The average molecular weights and the molecular weight distribution are polystyrene-equivalent weight average molecular weights measured by gel permeation chromatography. That the molecular weight distribution of the aminated epoxy resin exceeds 2.7 means that many side reactions have occurred with the reaction between the epoxy resin and the amino compound, and the intended performance of the aminated epoxy resin may not be exhibited.

In order to control the molecular weight distribution of the aminated epoxy resin to 2.7 or less, it is preferable to use a combination of the first amine and the second amine as the amine compound as described above, and the molecular weight distribution can be controlled by controlling the reaction temperature, the reaction time, and the like. For example, when the reaction temperature is lower than 120° C. or higher than 180° C., the molecular weight distribution tends to be high.

In the amine compound of the aminated epoxy resin, a primary amino group reacts to form a secondary amino group and is further converted to a tertiary amino group, and the amine compound is required to have a tertiary amination rate of 85% or more. The tertiary amination rate is calculated by tertiary amine value/total amine value×100, and expressed in %. The tertiary amine value refers to the number of mg of potassium hydroxide equivalent to perchloric acid required to neutralize a tertiary amine contained in 1 g of a sample. The tertiary amine value is measured by the following method in accordance with ASTM D2073.

Method of Testing Tertiary Amine Value (1) A sample is weighed in a 100 ml beaker.

(2) 0.5 g of pure water is added.

(3) The sample is dissolved in 50 g of THF (tetrahydrofuran).

(4) The mixture is stirred for 5 minutes.

(5) Next, 7.5 ml of acetic anhydride and 2.5 ml of acetic acid are added, and the mixture is stirred at about 40° C. for 5 minutes.

(6) The mixture is titrated with a 0.1 N perchloric acid solution in acetic acid using an automatic potentiometric titrator.

(7) The tertiary amine value is determined by the following formula.

Tertiary amine value=(titration amount mL×factor×10)/(sample amount g×solid content)

Method for Testing Total Amine Value (1) 500 mg of a sample is precisely weighed in a 200 ml Erlenmeyer flask.

(2) About 50 ml of glacial acetic acid is added and the sample is homogeneously dissolved.

(3) Five or six drops of an indicator methyl violet solution and the mixture is homogenized.

(4) The mixture is titrated with a 0.1 N perchloric acid solution in acetic acid, and the point at which the color becomes bright green is defined as an end point.

(The above (3) and (4) may be potentiometric titration.)

The aminated epoxy resin preferably has an amine value (the same as that the total amine value described above) in a range of 20 to 100 mg KOH/g. Due to the condition that the amine value of the aminated epoxy resin is 20 mg KOH/g or more, the emulsification-dispersion stability of the aminated epoxy resin in an electrodeposition coating composition is good. On the other hand, due to the condition that the amine value is 100 mg KOH/g or less, a proper number of amino groups are present in a cured electrodeposition coating film and a possibility to lower the water resistance of a coating film is eliminated. The amine value of the aminated epoxy resin is more preferably in a range of 20 to 80 mg KOH/g.

The tertiary amination rate of the aminated epoxy resin is also related to the conductivity of the electrodeposition coating composition, and when the tertiary amination rate decreases, the conductivity increases and the gas pinhole property deteriorates. The conductivity of the electrodeposition coating composition is preferably 1500 to 2000 $\mu S/cm^2$. When the conductivity is less than 1500, the throwing power deteriorates, and when the conductivity exceeds 2000, the gas pinhole property deteriorates and the appearance of a coating film surface deteriorates. The conductivity can be measured using a commercially available conductivity meter.

The aminated epoxy resin preferably has a hydroxyl value in a range of 150 to 650 mg KOH/g. The condition that the hydroxyl value is 150 mg KOH/g or more leads to good curing of a cured electrodeposition coating film and also improves the coating film appearance. On the other hand, due to the condition that the hydroxyl value is 650 mg KOH/g or less, a proper number of hydroxy groups remain in a cured electrodeposition coating film and a possibility to lower the water resistance of a coating film is eliminated. The hydroxyl value of the aminated epoxy resin is more preferably in a range of 150 to 400 mg KOH/g.

In the electrodeposition coating composition of the present invention, use of an aminated epoxy resin having a number-average molecular weight within the range of 1,000 to 7,000, an amine value of 20 to 100 mg KOH/g, and a hydroxyl value of 150 to 650 mg KOH/g, more preferably 150 to 400 mg KOH/g, affords an advantage that superior corrosion resistance can thereby be imparted to an article to be coated.

As the aminated epoxy resin, aminated epoxy resins differing in amine value and/or hydroxyl value may be used in combination, as necessary. When two or more aminated epoxy resins differing in amine value and hydroxyl value are used in combination, the average amine value and the average hydroxyl value calculated on the basis of the mass ratio of the aminated epoxy resins to be used are preferably within the above-mentioned numerical values. As the aminated epoxy resins to be used in combination, an aminated epoxy resin having an amine value of 20 to 50 mg KOH/g and a hydroxyl value of 50 to 300 mg KOH/g and an aminated epoxy resin having an amine value of 50 to 200 mg KOH/g and a hydroxyl value of 200 to 500 mg KOH/g are preferably used in combination. Use of such a combination affords an advantage that superior corrosion resistance can thereby be imparted because the core part of an emulsion is thereby made more hydrophobic and the shell part of the emulsion is made more hydrophilic.

The aminated epoxy resin may optionally contain an amino group-containing acrylic resin, an amino group-containing polyester resin, or the like.

<Blocked Polyisocyanate Curing Agent>

The blocked polyisocyanate curing agent (hereinafter sometimes simply referred to as "curing agent") is a coating film forming resin that constitutes an electrodeposition coating film. The blocked polyisocyanate curing agent can be prepared by blocking a polyisocyanate with an encapsulant.

Examples of the polyisocyanate include aliphatic diisocyanates such as hexamethylene diisocyanate (including a trimer), tetramethylene diisocyanate and trimethylhexamethylene diisocyanate; alicyclic polyisocianates such as isophorone diisocyanate and 4,4'-methylene-bis(cyclohexyl isocyanate); and aromatic diisocyanates such as 4,4'-diphenylmethane diisocyanate, tolylene diisocyanate and xylylene diisocyanate.

Examples of the encapsulant that may preferably be used include monohydric alkyl (or aromatic) alcohols such as n-butanol, n-hexyl alcohol, 2-ethylhexanol, lauryl alcohol, phenol carbinol and methylphenyl carbinol; cellosolves such as ethylene glycol monohexyl ether and ethylene glycol mono-2-ethylhexyl ether; polyether-type both-ended diols such as polyethylene glycol, polypropylene glycol and polytetramethylene ether glycol phenol; polyester-type both-ended polyols obtained from a diol such as ethylene glycol, propylene glycol or 1,4-butanediol and a dicarboxylic acid such as oxalic acid, succinic acid, adipic acid, suberic acid or sebacic acid; phenols such as para-t-butylphenol and cresol; oximes such as dimethyl ketoxime, methyl ethyl ketoxime, methyl isobutyl ketoxime, methyl amyl ketoxime and cyclohexanone oxime; and lactams typified by ε-caprolactam and γ-butyrolactam.

The blocking ratio of the blocked polyisocyanate curing agent is preferably 100%. This affords an advantage that the storage stability of the electrodeposition coating composition is improved.

As the blocked polyisocyanate curing agent, a curing agent prepared by blocking an aliphatic diisocyanate with an encapsulant and a curing agent prepared by blocking an aromatic diisocyanate with an encapsulant are preferably be used in combination.

The blocked polyisocyanate curing agent preferentially reacts with the primary amine of the aminated epoxy resin, and further reacts with a hydroxy group to be cured. As the curing agent, at least one curing agent selected from the group consisting of organic curing agents such as melamine resin or phenol resin, silane coupling agents, and metal curing agents may be used in combination with the blocked isocyanate curing agent.

Preparation of Resin Emulsion

The resin emulsion can be prepared by dissolving each of the aminated epoxy resin and the blocked polyisocyanate curing agent in an organic solvent to prepare a solution, mixing these solutions, and then performing neutralization with a neutralizing acid. Examples of the neutralizing acid include organic acids such as methanesulfonic acid, sulfamic acid, lactic acid, dimethylol propionic acid, formic acid, and acetic acid. In the present invention, it is more preferable to neutralize the resin emulsion containing the aminated epoxy resin and the curing agent with one or more acids selected from the group consisting of formic acid, acetic acid, and lactic acid.

The content of the blocked polyisocyanate curing agent is required be an amount sufficient for reacting with a primary amino group, a secondary amino group, or an active hydrogen-containing functional group such as a hydroxy group in the aminated epoxy resin during curing to afford a good cured coating film. A preferred content of the curing agent is within the range of from 90/10 to 50/50, more preferably from 80/20 to 65/35, in terms of the solid mass ratio of the aminated epoxy resin to the curing agent (aminated epoxy resin/curing agent). By adjusting the solid mass ratio of the aminated epoxy resin and the blocked polyisocyanate curing agent, the fluidity and the curing rate of the coating film (deposited film) at the time of film formation are improved, and the coating appearance is improved.

The solid content of the resin emulsion is usually 25 to 50% by mass, and preferably 35 to 45% by mass, based on the total amount of the resin emulsion. Here, the term "the solid content of a resin emulsion" means the mass of all components that are contained in the resin emulsion and remain in a solid form even after the removal of a solvent. Specifically, it means the total of the masses of the aminated epoxy resin, the curing agent, and other solid components optionally added, which are contained in the resin emulsion.

The neutralizing acid is more preferably used in an amount of 10 to 100%, even more preferably 20 to 70%, in the equivalent ratio of the neutralizing acid to the equivalent of the amino groups of the aminated epoxy resin. In the present description, the equivalent ratio of the neutralizing acid to the equivalent of the amino groups of the aminated epoxy resin is taken as the neutralization ratio. Due to the condition that the neutralization ratio is 10% or more, the affinity to water is secured and the dispersibility in water is improved.

<Pigment Dispersion Paste>

The cationic electrodeposition coating composition of the present invention may optionally contain a pigment dispersion paste. The pigment dispersion paste is a component that is optionally contained in an electrodeposition coating composition, and it commonly contains a pigment dispersion resin and a pigment.

Pigment Dispersion Resin

The pigment dispersion resin is a resin for dispersing a pigment, and it is dispersed in an aqueous medium and then used. As the pigment dispersion resin, there can be used a pigment dispersion resin having a cationic group, such as a modified epoxy resin having at least one member selected from the group consisting of a quaternary ammonium group, a tertiary sulfonium group, and a primary amino group. Specifically, examples of the pigment dispersion resin include a quaternary ammonium group-containing epoxy resin and a tertiary sulfonium group-containing epoxy resin. As the aqueous solvent, ion-exchanged water or water containing a small amount of alcohol is used.

Pigment

The pigment is a pigment that is commonly used in electrodeposition coating compositions. Examples of the pigment include inorganic pigments and organic pigments which are usually used, for example, coloring pigments such as titanium white (titanium dioxide), carbon black, and red iron oxide; extender pigments such as kaolin, talc, aluminum silicate, calcium carbonate, mica, and clay; and antirust pigments such as iron phosphate, aluminum phosphate, calcium phosphate, aluminum tripolyphosphate, aluminum phosphomolybdate, and aluminum zinc phosphomolybdate.

Production of Pigment Dispersion Paste

The pigment dispersion paste is prepared by mixing a pigment dispersion resin and a pigment. The content of the pigment dispersion resin in the pigment dispersion paste is not particularly limited, and the pigment dispersion resin can be used in an amount of 20 to 100 parts by mass in terms of resin solid content fraction per 100 parts by mass of the pigment.

The solid content of the pigment dispersion paste is preferably 40 to 70% by mass, particularly preferably 50 to 60% by mass, based on the total amount of the pigment dispersion paste.

The "solid content of a pigment dispersion paste" as referred to herein means the mass of all components contained in the pigment dispersion paste that remain in the form of solid even through removal of the solvent. Specifically, it means the total mass of the pigment dispersion resin, the pigment, and all other solid components optionally added that are contained in the pigment dispersion paste.

<Other Components>

The cationic electrodeposition coating composition of the present invention may further contain a metal nitrite in addition to the above-described components. As the metal nitrite, a nitrite of an alkali metal or a nitrite of an alkaline earth metal is preferable, and a nitrite of an alkaline earth metal is more preferable. Examples of the metal nitrite include calcium nitrite, sodium nitrite, potassium nitrite, magnesium nitrite, strontium nitrite, barium nitrite, and zinc nitrite.

The inclusion of the metal nitrite in the cationic electrodeposition coating composition has an advantage that corrosion resistance is improved, and especially, the corrosion resistance of an edge part (edge rust prevention property) is further improved. When the cationic electrodeposition coating composition contains the metal nitrite, the content thereof is preferably 0.001 to 0.2% by mass in terms of metal element of the metal component relative to the total mass of the coating film forming resin.

The metal nitrite may be added to the cationic electrodeposition coating composition by any method. For example, a method of preparing an aqueous solution of the metal nitrite in advance and then adding it to the cationic electrodeposition coating composition can be employed. Alternatively, the metal nitrite may be mixed with a pigment beforehand and then dispersed in the same manner as the pigment.

<Production of Cationic Electrodeposition Coating Composition>

The cationic electrodeposition coating composition of the present invention can be prepared by mixing a resin emulsion containing an aminated epoxy resin and a blocked polyisocyanate curing agent, a pigment dispersion paste, and additives or the like by a commonly used method.

The "solid content of an electrodeposition coating composition" as referred to herein means the mass of all components contained in the electrodeposition coating composition that remain in the form of solid even through removal of the solvent. Specifically, that means the total of the solid masses of the aminated epoxy resin and the blocked polyisocyanate curing agent contained in the electrodeposition coating composition, and the pigment dispersion resin, the pigment, and other solid components, which are contained as necessary.

The solid content of the cationic electrodeposition coating composition of the present invention is preferably 1 to 30% by mass based on the total amount of the electrodeposition coating composition. When the solid content of the cationic electrodeposition coating composition is less than 1% by mass, a reduced amount of an electrodeposition coating film will be deposited, so that it may be difficult to secure sufficient corrosion resistance. When the solid content of the cationic electrodeposition coating composition exceeds 30% by mass, throwing power or coating appearance may deteriorate.

The cationic electrodeposition coating composition of the present invention preferably has a pH of 4.5 to 7. When the pH of the cationic electrodeposition coating composition is less than 4.5, the amount of acid present in the cationic electrodeposition coating composition is excessive, so that coating film appearance or coating workability may be poor. On the other hand, when the pH exceeds 7, the filtration property of the cationic electrodeposition coating composition deteriorates, and the horizontal appearance of a cured electrodeposition coating film may deteriorate. The pH of the cationic electrodeposition coating composition can be set in the above range by adjusting the amount of a neutralizing acid to be used, the amount of a free acid to be added, etc. More preferably, the pH is 5 to 7.

The pH of the cationic electrodeposition coating composition can be measured using a commercially available pH meter having a temperature compensation function.

The milligram equivalent (MEQ (A)) of an acid per 100 g of the solid content of a cationic electrodeposition coating composition is preferably 10 to 50. The milligram equivalent (MEQ (A)) of an acid per 100 g of the resin solid content of the cationic electrodeposition coating composition can be adjusted by the amount of a neutralizing acid and the amount of a free acid.

MEQ (A) as referred to herein is an abbreviation of mg equivalent (acid), which is the sum total of mg equivalents of all acids per 100 g of the solid content of a coating material. The MEQ (A) can be measured by precisely weighing about 10 g of a solid of an electrodeposition coating composition, dissolving it in about 50 ml of a solvent (THF: tetrahydrofuran), then performing potentiometric titration using a 1/10 N NaOH solution and thereby determining the amount of an acid contained in the cationic electrodeposition coating composition.

The cationic electrodeposition coating composition of the present invention may optionally contain additives commonly used in the field of coating material, e.g., organic solvents such as ethylene glycol monobutyl ether, ethylene glycol monohexyl ether, ethylene glycol monoethylhexyl ether, propylene glycol monobutyl ether, dipropylene glycol monobutyl ether and propylene glycol monophenyl ether, drying inhibitors, surfactants such as antifoaming agents, viscosity modifiers such as acrylic resin fine particles, cissing inhibitors, inorganic anticorrosive agents such as vanadium salts, copper, iron, manganese, magnesium, and calcium salts. In addition to these, known auxiliary complexing agents, buffers, smoothing agents, stress relaxation agents, brighteners, semi-brighteners, antioxidants, ultraviolet absorbers, etc. may be blended according to the intended purpose. These additives may be added during the production of a resin emulsion or may be added during the production of a pigment dispersion paste or may be added during or after the mixing a resin emulsion and a pigment dispersion paste.

The cationic electrodeposition coating composition of the present invention may contain other coating film forming resin components in addition to the aminated epoxy resin. Examples of such other coating film forming resin components include acrylic resins, polyester resins, urethane resins, butadiene-based resins, phenol resins, and xylene resins. As such other coating film forming resin components that may be contained in the electrodeposition coating composition, phenol resins and xylene resins are preferable. Examples of the phenol resins and the xylene resins include xylene resins having 2 or more and 10 or less aromatic rings.

With the cationic electrodeposition coating composition of the present invention, also the solubility parameter (SP) of a mixture prepared by mixing an aminated epoxy resin and the blocked polyisocyanate curing agent serves as one index for observing the performance of an electrodeposition coating material. In the present invention, it is required that the solubility parameter (SP) of a mixture of an aminated epoxy resin and the blocked polyisocyanate curing agent is 9.9 to 11.3, preferably 9.9 to 11.2, and more preferably 9.9 to 11.1. When the solubility parameter (SP) of the mixture of an aminated epoxy resin and the blocked polyisocyanate curing agent is less than 9.9, the adhesion deteriorates, and conversely, when the solubility parameter (SP) is more than 11.3, the hydrophilicity increases and the blocking property of a coating film deteriorates.

It is preferable for the cationic electrodeposition coating composition of the present invention that the number of adhesion functional groups remaining after the cationic electrodeposition coating composition of the present invention is applied to a steel sheet so as to have a dry film thickness of 15 μm and baked at 170° C. for 20 minutes is 78.6 to 134.7 mg KOH/g. This specifies the performance of a coating film after a coating composition is obtained. The number of remaining adhesion functional groups is a theoretical value and can be determined by calculation, and it was determined by subtracting the amount of the isocyanate groups (mg KOH/g) of the blocked polyisocyanate curing agent from the amount of the functional groups of the aminated epoxy resin, specifically, the total of the amount of the hydroxy groups (mg KOH/g) and the amount of the primary amine (mg KOH/g). The number of remaining adhesion functional groups is preferably 89.8 to 123.4 mg KOH/g, and more preferably 95.4 to 117.8 mg KOH/g. When the number of remaining adhesion functional groups in a coating film applied under this condition is less than 78.6 mg KOH/g, sufficient adhesion performance cannot be imparted to the coating film, and when it is more than 134.7 mg KOH/g, the hydrophilicity of the coating film increases and the blocking property of the coating film disadvantageously deteriorates.

<Electrodeposition Coating and Formation of Electrodeposition Coating Film>

By subjecting an article to be coated to electrodeposition coating using the cationic electrodeposition coating composition of the present invention, an electrodeposition coating film can be formed. In electrodeposition coating using the cationic electrodeposition coating composition of the present invention, an article to be coated is used as a cathode, and a voltage is applied between the cathode and an anode. As a result, an electrodeposition coating film is deposited on the article to be coated.

As an article to be coated with the cationic electrodeposition coating composition of the present invention, it is possible to use various materials which can be fed with electricity. Examples of the usable article to be coated include cold-rolled steel sheets, hot-rolled steel sheets, stainless steels, electrogalvanized steel sheets, hot-dip galvanized steel sheets, zinc-aluminum alloy-based plated steel sheets, zinc-iron alloy-based plated steel sheets, zinc-magnesium alloy-based plated steel sheets, zinc-aluminum-magnesium alloy-based plated steel sheets, aluminum-based plated steel sheets, aluminum-silicon alloy-based steel sheets, and tin-based plated steel sheets.

In an electrodeposition coating step, electrodeposition coating is performed by immersing an article to be coated in an electrodeposition coating composition, and then applying a voltage of 50 to 450 V. When the applied voltage is less than 50 V, electrodeposition may be insufficient, and when the applied voltage is more than 450 V, the coating film appearance may be poor. During electrodeposition coating, the bath liquid temperature of the coating composition is usually adjusted to 10 to 45° C.

The time for which the voltage is applied varies depending on electrodeposition conditions, and it may be generally 2 to 5 minutes.

In the electrodeposition coating using the cationic electrodeposition coating composition of the present invention, the thickness of the electrodeposition coating film to be deposited is preferably such that a thickness of the electrodeposition coating film finally obtained by heating and curing may preferably be 5 to 60 μm, more preferably 10 to 25 μm. If an electrodeposition coating film has a film thickness of less than 5 μm, the rust prevention property of the film may be insufficient.

The electrodeposition coating film deposited as described above can be cured by optionally washing it with water, and then heating it at, for example, 120 to 260° C., preferably 140 to 220° C., for 10 to 30 minutes. A cured electrodeposition coating film is thereby formed.

In the present invention, the rate of elongation of a cured coating film is regulated. The rate of elongation is determined by measuring the rate of elongation of an electrodeposition coating film formed by applying the cationic electrodeposition coating composition to a steel sheet such that a cured film thickness is 20 μm, followed by baking at 160° C. for 15 minutes. Specifically, the rate of elongation is determined by calculating the ratio (%) of the length by which the coating film is elongated until the coating film is broken to the length of the coating film before the measurement. The rate of elongation determined by this measurement is 0.1 to 4.5%, and preferably 2.0 to 4.5%. When the rate of elongation is less than 0.1%, there is a disadvantage that the impact resistance test is lowered, and when the rate of elongation exceeds 4.5%, there is a disadvantage that an enlarged blister of the coating film occurs during a corrosion resistance test.

The cationic electrodeposition coating composition of the present invention affords an advantage that a cured electrodeposition coating film superior in edge part rust prevention property can be formed even when a cured electrodeposition coating film is formed on an article to be coated having an edge part. The cationic electrodeposition coating composition of the present invention has a function of forcing a deposited electrodeposition coating film to stay, and therefore, it can be used suitably in the case of forming a cured electrodeposition coating film on an article to be coated having an edge part.

In the present description, evaluation of the corrosion resistance of a cured electrodeposition coating film formed on an article to be coated having an edge part is perform by a salt water spray test (35° C.×72 hours) according to JIS Z2371 (2000). For example, when a cured electrodeposition coating film having a large film thickness, e.g., of 25 to 50 µm is subjected to a salt water spray test and the number of rust colonies formed at a coated edge part of the cured electrodeposition coating film formed on an article to be coated having an edge part is less than 3 colonies/cm$^2$ per 1 cm$^2$ of an edge part, the coating film is a coating film superior in corrosion resistance (rust prevention property) of the edge part, and when the number of rust colonies is less than 1 colony/cm$^2$ per 1 cm$^2$ of an edge part, the coating film is a coating film excellent in corrosion resistance of the edge part.

EXAMPLES

The present invention will be described hereafter in more detail by way of examples, to which the present invention is not intended to be limited. In the examples, "parts" and "%" are on a mass basis unless otherwise indicated.

Production Example 1—A: Production of Aminated Epoxy Resin (Resin A)

First, 12 parts of butyl cellosolve, 940 parts of a bisphenol A type epoxy resin (trade name: DER-331J, produced by The Dow Chemical Company), 325 parts of bisphenol A, 4.2 parts of phenol and 2 parts of dimethylbenzylamine were added, and then were reacted until the epoxy equivalent was 600 g/eq while the temperature in the reaction vessel was held at 120° C., and then cooling was performed until the temperature in the reaction vessel was 110° C. A mixture of 110 parts of diethanolamine (DETA) and 80 parts of aminopropyldiethanolamine (APDEA) was then added thereto, and reacted at 140° C. for 1 hour, affording an aminated epoxy resin (cationically modified epoxy resin: resin A).

Production Example 1-B: Production of Aminated Epoxy Resin (Resin B)

First, 12 parts of butyl cellosolve, 940 parts of a bisphenol A type epoxy resin (trade name: DER-331J, produced by The Dow Chemical Company), 325 parts of bisphenol A, 4.2 parts of phenol and 2 parts of dimethylbenzylamine were added, and then were reacted until the epoxy equivalent was 620 g/eq while the temperature in the reaction vessel was held at 120° C., and then cooling was performed until the temperature in the reaction vessel was 110° C. A mixture of 110 parts of diethanolamine (DETA) and 70 parts of diethylaminopropanediamine (DEAPA) was then added thereto, and reacted at 140° C. for 1 hour, affording an aminated epoxy resin (cationically modified epoxy resin: resin B).

Production Example 1-C: Production of Aminated Epoxy Resin (Resin C)

First, 12 parts of butyl cellosolve, 940 parts of a bisphenol A type epoxy resin (trade name: DER-331J, produced by The Dow Chemical Company), 325 parts of bisphenol A, 4.2 parts of phenol and 2 parts of dimethylbenzylamine were added, and then were reacted until the epoxy equivalent was 620 g/eq while the temperature in the reaction vessel was held at 120° C., and then cooling was performed until the temperature in the reaction vessel was 110° C. A mixture of 110 parts of diethanolamine (DETA) and 100 parts of dibutylaminopropanediamine (DBAPA) was then added thereto, and reacted at 140° C. for 1 hour, affording an aminated epoxy resin (cationically modified epoxy resin: resin C).

Production Example 1-D: Production of Aminated Epoxy Resin (Resin D)

First, 12 parts of butyl cellosolve, 940 parts of a bisphenol A type epoxy resin (trade name: DER-331J, produced by The Dow Chemical Company), 325 parts of bisphenol A, 23 parts of phenol and 2 parts of dimethylbenzylamine were added, and then were reacted until the epoxy equivalent was 650 g/eq while the temperature in the reaction vessel was held at 120° C., and then cooling was performed until the temperature in the reaction vessel was 110° C. A mixture of 50 parts of dimethylaminopropylamine (DMAPA) and 100 parts of diethanolamine (DETA) was then added thereto, and reacted at 160° C. for 1 hour, affording an aminated epoxy resin (cationically modified epoxy resin: resin D).

Production Example 1-E: Production of Aminated Epoxy Resin (Resin E)

First, 25 parts of butyl cellosolve, 940 parts of a bisphenol A type epoxy resin (trade name: DER-331J, produced by The Dow Chemical Company), 380 parts of bisphenol A, 58 parts of phenol and 2 parts of dimethylbenzylamine were added, and then were reacted until the epoxy equivalent was 1100 g/eq while the temperature in the reaction vessel was held at 120° C., and then cooling was performed until the temperature in the reaction vessel was 110° C. Then, 110 parts of diethanolamine (DETA) and 10 parts of N-methylethanolamine (MMA) were added thereto, and reacted at 140° C. for 1 hour, affording an aminated epoxy resin (cationically modified epoxy resin: resin E).

Production Example 1-F: Production of Aminated Epoxy Resin (resin F)

First, 26 parts of butyl cellosolve, 940 parts of a bisphenol A type epoxy resin (trade name: DER-331J, produced by The Dow Chemical Company), 380 parts of bisphenol A, 58 parts of phenol and 2 parts of dimethylbenzylamine were added, and then were reacted until the epoxy equivalent was 1100 g/eq while the temperature in the reaction vessel was held at 120° C., and then cooling was performed until the temperature in the reaction vessel was 110° C. Then, 60 parts of diethanolamine (DETA), 20 parts of N-methylethanolamine (MMA), and 85 parts of diethylenetriamine diketimine (diketimine: methyl isobutyl ketone solution having a solid content of 73%) were added thereto, and reacted at 140° C. for 1 hour, affording an aminated epoxy resin (cationically modified epoxy resin: resin F).

Production Example 1-G: Production of Aminated Epoxy Resin (Resin G)

First, 12 parts of butyl cellosolve, 940 parts of a bisphenol A type epoxy resin (trade name: DER-331J, produced by The Dow Chemical Company), 325 parts of bisphenol A, 4.2 parts of phenol and 2 parts of dimethylbenzylamine were added, and then were reacted until the epoxy equivalent was 620 g/eq while the temperature in the reaction vessel was held at 120° C., and then cooling was performed until the temperature in the reaction vessel was 110° C. A mixture of 110 parts of diethanolamine (DETA) and 70 parts of diethylaminopropanediamine (DEAPA) was then added thereto, and reacted at 90° C. for 1 hour, affording an aminated epoxy resin (cationically modified epoxy resin: resin G).

Production Example 1-H: Production of Aminated Epoxy Resin (Resin H)

First, 12 parts of butyl cellosolve, 940 parts of a bisphenol A type epoxy resin (trade name: DER-331J, produced by The Dow Chemical Company), 325 parts of bisphenol A, 4.2 parts of phenol and 2 parts of dimethylbenzylamine were added, and then were reacted until the epoxy equivalent was 600 g/eq while the temperature in the reaction vessel was held at 120° C., and then cooling was performed until the temperature in the reaction vessel was 110° C. A mixture of 110 parts of diethanolamine (DETA) and 80 parts of aminopropyldiethanolamine (APDEA) was then added thereto, and reacted at 220° C. for 1 hour, affording an aminated epoxy resin (cationically modified epoxy resin: resin H).

The type and use amount of the amine compounds of the aminated epoxy resins obtained in the above Production Examples, the amination temperature (° C.), the molecular weight distribution, and the tertiary amination rate of the amine compounds are shown in Table 1. The molecular weight distribution and the tertiary amination rate were measured as follows.

The molecular weight distribution was measured by gel permeation chromatography. Specifically, the number-average molecular weight is measured under the following GPC system measurement conditions.
Apparatus: alliance2695 Separations Module
Column: Tosoh TSKgel ALPHA-M
Flow rate: 0.05 ml/min
Detector: alliance2414 Refractive Index Detector
Mobile layer: N,N'-dimethylformamide
Standard samples: TSK STANDARD POLYSTYRENE (produced by Tosoh Corporation), A-500, A-2500, F-1, F-4, F-20, F-80, F-700, 1-phenylhexane (produced by Aldrich)
Tertiary Amination Rate Tertiary amination rate (%)=tertiary amine value/total amine value Method of Testing Tertiary Amine Value
(1) A sample is weighed in a 100 ml beaker.
(2) 0.5 g of pure water is added.
(3) The sample is dissolved in 50 g of THF (tetrahydrofuran).
(4) The mixture is stirred for 5 minutes.
(5) Next, 7.5 ml of acetic anhydride and 2.5 ml of acetic acid are added, and the mixture is stirred at about 40° C. for 5 minutes.
(6) The mixture is titrated with a 0.1 N perchloric acid solution in acetic acid using an automatic potentiometric titrator.
(7) The tertiary amine value is determined by the following formula.

Tertiary amine value=(titration amount mL×factor×10)/(sample amount g×solid content)

Method for Testing Total Amine Value
(1) 500 mg of a sample is precisely weighed in a 200 ml Erlenmeyer flask.
(2) About 50 ml of glacial acetic acid is added and the sample is homogeneously dissolved.
(3) Five or six drops of an indicator methyl violet solution and the mixture is homogenized.
(4) The mixture is titrated with a 0.1 N perchloric acid solution in acetic acid, and the point at which the color becomes bright green is defined as an end point.
(The above (3) and (4) may be potentiometric titration.)

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Production Example No. | | 1-A | 1-B | 1-C | 1-D | 1-E | 1-F | 1-G | 1-H |
| Blend of aminated epoxy resins, characteristic numbers | Diketimine | | | | | | 85 | | |
| | MMA | | | | | 10 | 20 | | |
| | DETA | 110 | 110 | 110 | 100 | 110 | 60 | 110 | 110 |
| | DMAPA | | | | 50 | | | | |
| | APDEA | 80 | | | | | | | 80 |
| | DEAPA | | 70 | | | | | 70 | |
| | DBAPA | | | 100 | | | | | |
| | Amination temperature/° C. | 140 | 140 | 140 | 160 | 140 | 140 | 90 | 220 |
| | Molecular weight distribution | 2.0 | 2.4 | 2.7 | 2.0 | 3.4 | 2.8 | 3.6 | 2.9 |
| | Tertiary amination rate/% | 100 | 96 | 100 | 87 | 100 | 100 | 75 | 73 |

Production Example 2: Production of Blocked Polyisocyanate Curing Agent (1)

A reaction vessel was charged with 1370 parts of polymethylene polyphenyl polyisocyanate (MDI)hexamethylene diisocyanate (HDI) and 732 parts of MIBK, and the mixture was heated to 60° C. To this, 300 parts of butyl diglycol ether and 1330 of butyl cellosolve were added dropwise at 60° C. over 2 hours. Further, the mixture was heated at 75° C. for 4 hours, disappearance of an absorption based on an isocyanate group was then confirmed in IR spectrum measurement. The mixture was allowed to cool and 27 parts of MIBK was then added, affording a blocked polyisocyanate curing agent (1).

Production Example 3: Preparation of Pigment Dispersion Resin

A reaction vessel equipped with a stirrer, a condenser tube, a nitrogen inlet tube, and a thermometer was charged with 2220 parts of isophorone diisocyanate and 342.1 parts of methyl isobutyl ketone. The temperature was raised, 2.2 parts of dibutyl tin laurate was added at 50° C., and 878.7 parts of methyl ethyl ketone oxime was added at 60° C. Thereafter, the mixture was kept at 60° C. for 1 hour and it was confirmed that the NCO equivalent was 348, and then 890 parts of dimethylethanolamine was added thereto. The mixture was kept at 60° C. for 1 hour and it was confirmed by IR that the NCO peak disappeared. Then, 1872.6 parts of 50% lactic acid and 495 parts of deionized water were added while the mixture was cooled such that the temperature did not exceed 60° C., affording a quaternizing agent. Subsequently, 870 parts of tolylene diisocyanate and 49.5 parts of methyl isobutyl ketone were added in a different reaction vessel, and 667.2 parts of 2-ethylhexanol was added dropwise thereto over 2.5 hours such that the temperature did not reach 50° C. or higher. After completion of the dropwise addition, 35.5 parts of methyl isobutyl ketone was added thereto, and the temperature of the mixture was kept for 30 minutes. Thereafter, it was confirmed that the NCO equivalent was 330 to 370, and a half-blocked polyisocyanate was obtained.

In a reaction vessel equipped with a stirrer, a condenser tube, a nitrogen inlet tube and a thermometer, 940.0 parts of a bisphenol A type epoxy resin (trade name: DER-331J, manufactured by The Dow Chemical Company) was diluted with 38.5 parts of methanol, and then 0.1 parts of dibutyltin dilaurate was added thereto. The mixture was heated to 50° C., 87.1 parts of tolylene diisocyanate was then added, and the temperature was further raised. 1.4 parts of N,N-dimethylbenzylamine was added at 100° C., and the mixture was kept at 130° C. for 2 hours. At this time, methanol was fractionated by a fractionating column. The residue was cooled to 115° C., and methyl isobutyl ketone was charged until the solid concentration reached 90%, then 270.3 parts of bisphenol A and 39.2 parts of 2-ethylhexanoic acid were charged, and the mixture was heated and stirred at 125° C. for 2 hours, and then 516.4 parts of the half-blocked polyisocyanate was added dropwise over 30 minutes, followed by heating and stirring for 30 minutes. 1506 parts of polyoxyethylene bisphenol A ether was gradually added and dissolved. After cooling to 90° C., the quaternizing agent was added, and the acid value of 2 or less was confirmed while the temperature was maintained at 70 to 80° C., affording a pigment dispersion resin (resin solid content: 30%).

Production Example 4: Preparation of Pigment Dispersion Paste

A sand grinding mill was charged with 106.9 parts of the pigment dispersion resin obtained in Production Example 3, 1.6 parts of carbon black, 40 parts of kaolin, 55.4 parts of titanium dioxide, 3 parts of aluminum phosphomolybdate, and 13 parts of deionized water, and then the mixture was dispersed until the particle size reached 10 μm or less, affording a pigment dispersion paste (solid content: 60%).

Production Example 5-A: Production of Electrodeposition Coating Resin Emulsion (EmA)

400 g (solid content) of the resin (resin A) obtained in Production Example 1-A was mixed with 160 g (solid content) of the blocked polyisocyanate curing agent (1) obtained in Production Example 2, and ethylene glycol mono-2-ethylhexyl ether was added in an amount of 3% (15 g) based on the solid content. Next, the mixture was neutralized by adding formic acid such that a neutralization ratio of 40% was achieved, and slowly diluted by adding ion-exchanged water, thereby affording an electrodeposition coating resin emulsion (EmA).

Production Examples 5-B to 5-H: Production of Electrodeposition Coating Resin Emulsions (EmB to EmH)

As for the aminated epoxy resins (resins B to H) obtained in Production Examples 1-B to 1-H, electrodeposition coating resin emulsions (EmB to EmH) were obtained in the same manner as in Production Example 5-A.

Example 1

A stainless steel container was charged with 1394 g of ion-exchanged water, 560 g of the resin emulsion (EmA) and 41 g of the pigment dispersion paste obtained in Production Example 4, and the mixture was then aged at 40° C. for 16 hours, forming an electrodeposition coating composition.

Examples 2 to 4 and Comparative Examples 1 to 4

Electrodeposition coating compositions of Examples 2, 3, and 4 (EmB, EmC, EmD) and Comparative Examples 1, 2, 3, and 4 (EmE, EmF, EmG, and EmH) were obtained in the same manner as in Example 1.

<Conductivity>

In an electrodeposition bath containing 200 ml of the cationic electrodeposition coating composition obtained in each of Examples and Comparative Examples, the conductivity was measured at 25° C. using a conductivity meter (CM-305 manufactured by TOA Electronics Ltd.). The measured conductivities are shown in Table 2. The unit is μS/cm$^2$.

Electrodeposition Coating

A cold-rolled steel sheet (JIS G3141, SPCC-SD) was immersed in SURFCLEANER EC90 (produced by Nippon Paint Surf Chemicals Co., Ltd.) at 50° C. for 2 minutes, thereby being degreased. Next, the resultant steel sheet was subjected to a zirconium chemical conversion treatment by immersing the steel sheet in a zirconium chemical conversion treatment solution containing 0.005% of ZrF and adjusted to pH 4 using NaOH, at 40° C. for 90 seconds. Next, a required amount of 2-ethylhexyl glycol was added to the electrodeposition coating composition obtained in each of Examples and Comparative Examples such that the thickness of an electrodeposition coating film after curing was 20 μm, and then, the steel sheet was immersed and a voltage was applied under the condition that the steel sheet was held for 150 seconds after reaching 180 V by raising the voltage for 30 seconds. Thereby, an uncured electrodeposition coating film was deposited on an article to be coated.

The thus-obtained uncured electrodeposition coating film was baked and cured at 160° C. for 15 minutes, affording an electrodeposition coated sheet having a cured electrodeposition coating film. The obtained cured electrodeposition coating film was evaluated as follows. The results are shown in Table 2. In Table 2, characteristics (curing property (rubbing resistance), rate of elongation, cycle corrosion test (CCT), edge rust prevention, coating workability, and coating material stability) of each electrodeposition coating composition are also described. The respective evaluation methods and evaluation criteria are described below.

The following evaluation tests were carried out using the electrodeposition coating compositions and the coated sheets obtained in the above Examples.

Curing Property (Rubbing Resistance)

The coating film was rubbed 50 times with gauze soaked in methyl isobutyl ketone (MIBK), and the curing property was determined on the basis of the surface state of the coating film. The evaluation criteria are as follows.
  ⊙: There is no change in the coating film.
  Δ: There are streaks in the coating film.
  x: The gauze is colored.
Rate of Elongation (%)

A stress-strain curve of the coating film is prepared, and the ratio (%) of the length by which the sample was elongated until the sample was broken to the initial sample length is determined by calculation.
Cycle Corrosion Test (CCT)

A coating film of an electrodeposition coated sheet after curing using a cold-rolled steel sheet was cross-cut with a knife to reach the substrate, and 100 cycles of JASO M609-91 "Method for Testing Corrosion of Automotive Materials" were carried out. Thereafter, the generation of rust and blister from the cross-cut part was observed, and the corrosion resistance in the actual corrosion environment was evaluated. Evaluation criteria are as follows.
Evaluation Criteria
  ⊙: The maximum width of a rust or a blister is less than 5 mm from the cut part (both sides).
  ○: The maximum width of a rust or a blister is 5 mm or more and less than 7.5 mm from the cut part (both sides) and there is no blister except for the cut part.
  ○Δ: The maximum width of a rust or a blister is 5 mm or more and less than 7.5 mm from the cut part (both sides) and there is a blister also in a part other than the cut part.
  Δ: The maximum width of a rust or a blister is 7.5 mm or more and less than 10 mm from the cut part (both sides).
  Δx: The maximum width of a rust or a blister is 10 mm or more and less than 12.5 mm from the cut part (both sides).
  x: The maximum width of a rust or a blister is 12.5 mm or more from the cut part (both sides).
  ○Δ or more is acceptable.
Edge Rust Prevention (Edge Corrosion Test)

For evaluation in this test, a sample obtained by immersing an L-shaped dedicated replacement blade (LB 10 K: manufactured by OLFA CORPORATION) in a SURFCLEANER EC 90 (manufactured by Nippon Paint Surf Chemicals Co., Ltd.) at 50° C. for 2 minutes to perform a degreasing treatment, adjusting the surface of the blade with SURFFINE GL-1 (manufactured by Nippon Paint Surf Chemicals Co., Ltd.), and then immersing the blade in SURFDYNE SD-5000 (zinc phosphate chemical conversion solution manufactured by Nippon Paint Surf Chemicals Co., Ltd.) as a zinc phosphate chemical conversion solution at 40° C. for 2 minutes to perform a zinc phosphate chemical conversion treatment was used, in place of the cold-rolled steel sheet. Then, each of the coating materials of Examples 1 to 4 and Comparative Examples 1 to 4 was subjected to electrodeposition coated under the same conditions as in the above-described electrodeposition coating, thereby forming a cured electrodeposition coating film, and then the number of rust colonies at the tip of the L-shaped dedicated replacement blade after a salt spray test at 35° C. for 168 hours was examined.
Evaluation Criteria
  ⊙: The number of rusts is less than 10.
  ○: The number of rusts is 10 or more and less than 20.
  ○Δ: The number of rusts is 20 or more and less than 50.
  Δ: The number of rusts is 50 or more and less than 100.
  x: The number of rusts is 100 or more.
  ○Δ or more is acceptable.
Coating Workability (GP: Grinding Unevenness)

The roughness of the appearance of a ground part when electrodeposition coating was applied to a steel sheet ground using a grindstone was visually determined.
  ○: The coated plate has a uniform coating film appearance.
  ○Δ: The coated plate has an almost uniform coating film appearance as a whole, although there are some areas that are visually recognized as slightly uneven.
  Δ: Unevenness is visually recognized.
  x: The coating film appearance is clearly uneven.
Stability of Electrodeposition Coating Composition (Coating Material Stability)

In a state where an electrodeposition coating composition was left standing or stirred, the state of the coating composition was visually determined, and coating material stability was evaluated. The evaluation criteria were as follows. The term "stable" as used herein means that the pigment does not precipitate within 15 minutes after the stirring is stopped.
Evaluation Criteria
  ○: The electrodeposition coating composition is stable in a state where the electrodeposition coating composition is left standing.
  ○Δ: Although the electrodeposition coating composition is not stable in a state where the composition is left standing, the composition is immediately stabilized by being stirred again.
  Δ: The electrodeposition coating composition is stable in a state where the composition is continuously stirred.
  x: The electrodeposition coating composition is not stabilized even in a state where the composition is continuously stirred.

TABLE 2

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Physical properties of coating material, evaluation of coating film | Conductivity ($\mu S/cm^2$) | 1700 | 1600 | 1600 | 1800 | 2100 | 1600 | 2500 | 2600 |
| | Rubbing resistance | ○ | ○ | ○ | ○ | ○ | ○ | ○ | ○ |
| | Rate of elongation/% | 3.0 | 4.2 | 4.0 | 3.5 | 5.0 | 4.2 | 5.0 | 5.6 |
| | Cycle corrosion test (CCT) | ○ | ○ | ○ | ○ | Δ | Δ | Δ | Δ |
| | Edge rust prevention | ○ | ○ | ○ | ○ | Δ | Δ | Δ | Δ |

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Coating workability (GP) | ○Δ | ○Δ | ○Δ | ○Δ | Δ | ○Δ | Δ | Δ |
| Coating material stability | ○ | ○ | ○ | ○ | ○ | ○ | ○ | ○ |

As is apparent from Table 2 above, when the molecular weight distribution of an aminated epoxy resin is 2.7 or less and the rate of elongation is in the range of 0.1 to 4.5%, good results are obtained in corrosion resistance (cycle corrosion test and edge rust prevention), and other performances (coating workability and coating material stability) are also superior. On the other hand, in Comparative Examples, when the molecular weight distribution of an aminated epoxy resin and the rate of elongation of an electrodeposition coating film deviate from their ranges, the result of corrosion resistance is not sufficient, and the coating workability is also insufficient.

The invention claimed is:

1. A cationic electrodeposition coating composition comprising an aminated epoxy resin and a blocked polyisocyanate curing agent, wherein
the aminated epoxy resin is an aminated epoxy resin obtained by reacting an amine compound with an epoxy resin,
the amine compound is a combination of a first amine and a second amine,
the first amine is represented by a formula:

$$NH_2-(CH_2)n-NR^1R^2 \qquad (1)$$

in the formula (1), $R^1$ and $R^2$ are the same or different and each represent an alkyl group having 1 to 6 carbon atoms and optionally having a hydroxy group at a terminal thereof, and n represents an integer of 2 to 4, and
the second amine is represented by a formula:

$$R^3R^4NH \qquad (2)$$

in the formula (2), $R^3$ and $R^4$ each represent an alkyl group having 1 to 4 carbon atoms and having a hydroxy group at a terminal thereof,
a tertiary amination rate of the amine compound in obtaining the aminated epoxy resin, which is calculated by tertiary amine value/total amine value×100, is 85% or more,
the epoxy resin is a polyphenol polyglycidyl ether type epoxy resin,
the aminated epoxy resin has a molecular weight distribution of 2.7 or less, and
a rate of elongation of an electrodeposition coating film formed by applying the cationic electrodeposition coating composition to a steel sheet such that a cured film thickness is 20 μm, followed by baking at 160° C. for 15 minutes, is 0.1 to 4.5%.

2. A cationic electrodeposition coating film formed using the cationic electrodeposition coating composition according to claim 1.

* * * * *